US012585751B2

(12) United States Patent
Rawat et al.

(10) Patent No.: US 12,585,751 B2
(45) Date of Patent: Mar. 24, 2026

(54) MULTI-MODAL GESTURE SEQUENCE PASSCODE UNLOCKING APPARATUS FOR A HEAD-MOUNTED DISPLAY

(71) Applicant: STMicroelectronics International N.V., Geneva (CH)

(72) Inventors: Saurabh Rawat, Noida (IN); Prashant Pandey, Kanpur (IN); Raunaque Mujeeb Quaiser, Ghaziabad (IN); Ranjeet Singh, New Delhi (IN)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 93 days.

(21) Appl. No.: 18/422,231

(22) Filed: Jan. 25, 2024

(65) Prior Publication Data

US 2025/0245309 A1    Jul. 31, 2025

(51) Int. Cl.
*G06F 21/36* (2013.01)
*G02B 27/01* (2006.01)
*G06F 3/01* (2006.01)

(52) U.S. Cl.
CPC ........... *G06F 21/36* (2013.01); *G02B 27/017* (2013.01); *G06F 3/017* (2013.01); *G02B 2027/0138* (2013.01)

(58) Field of Classification Search
CPC .......... G06F 21/36; G06F 3/017; G06F 3/013; G02B 27/017; G02B 2027/0138
See application file for complete search history.

(56) References Cited

U.S. PATENT DOCUMENTS

2014/0310764 A1*  10/2014  Tippett .................... G06F 21/31
                                                             726/1
2015/0220152 A1*  8/2015  Tait ......................... G06F 3/017
                                                             345/156

(Continued)

OTHER PUBLICATIONS

Jaime Ruiz and Yang Li. 2011. DoubleFlip: a motion gesture delimiter for mobile interaction. In Proceedings of the SIGCHI Conference on Human Factors in Computing Systems (CHI '11). Association for Computing Machinery, New York, NY, USA, 2717-2720. (Year: 2011).*

(Continued)

*Primary Examiner* — Kambiz Zand
*Assistant Examiner* — Lawrence Q Truong
(74) *Attorney, Agent, or Firm* — Alston & Bird LLP

(57) ABSTRACT

An example apparatus, a computer-implemented method, and a computer program product for utilizing a plurality of sensors on a head-mounted display to unlock locked features of the head-mounted display are provided. The example apparatus includes a head-mounted display, a plurality of sensors mounted on the head-mounted display and configured to detect a gesture of a user of the head-mounted display, and a multi-modal unlocking model. The multi-modal unlocking model further includes one or more processors and one or more storage devices storing instructions that are operable, when executed by the one or more processors, to cause the one or more processors to detect a gesture sequence passcode comprising one or more passcode gestures in a series of passcode gestures delimited by a physical interaction with the head-mounted display, and unlock a locked feature of the head-mounted display based on the gesture sequence passcode.

17 Claims, 13 Drawing Sheets

1300

(56) References Cited

U.S. PATENT DOCUMENTS

| 2016/0078210 | A1 | | 3/2016 | Lymberopoulos et al. | |
|---|---|---|---|---|---|
| 2017/0139567 | A1 | * | 5/2017 | Li | G06F 3/017 |
| 2020/0065569 | A1 | * | 2/2020 | Nduka | G10L 13/02 |
| 2020/0097065 | A1 | * | 3/2020 | Iyer | G06F 3/017 |
| 2021/0089638 | A1 | | 3/2021 | Seiler et al. | |
| 2023/0273985 | A1 | | 8/2023 | Suchan et al. | |

OTHER PUBLICATIONS

S. Lee, K. Song and J. Choi, "Access to an Automated Security System Using Gesture-Based Passwords," 2012 15th International Conference on Network-Based Information Systems, Melbourne, VIC, Australia, 2012, pp. 760-765, doi: 10.1109/NBiS.2012.136. (Year: 2012).*
Zhao, Yiming, Zhao, Yanchao, Tu, Huawei, Huang, Qihan, Zhao, Wenlai, Jiang, Wenhao, Motion Gesture Delimiters for Smartwatch Interaction, Wireless Communications and Mobile Computing, 2022, 6879206, 11 pages, 2022. (Year: 2022).*
Han et al., "Gyroscope-Based Continuous Human Hand Gesture Recognition for Multi-Modal Wearable Input Device for Human Machine Interaction" Sensors. 2019; 19(11):2562. https://doi.org/10.3390/s19112562.

* cited by examiner

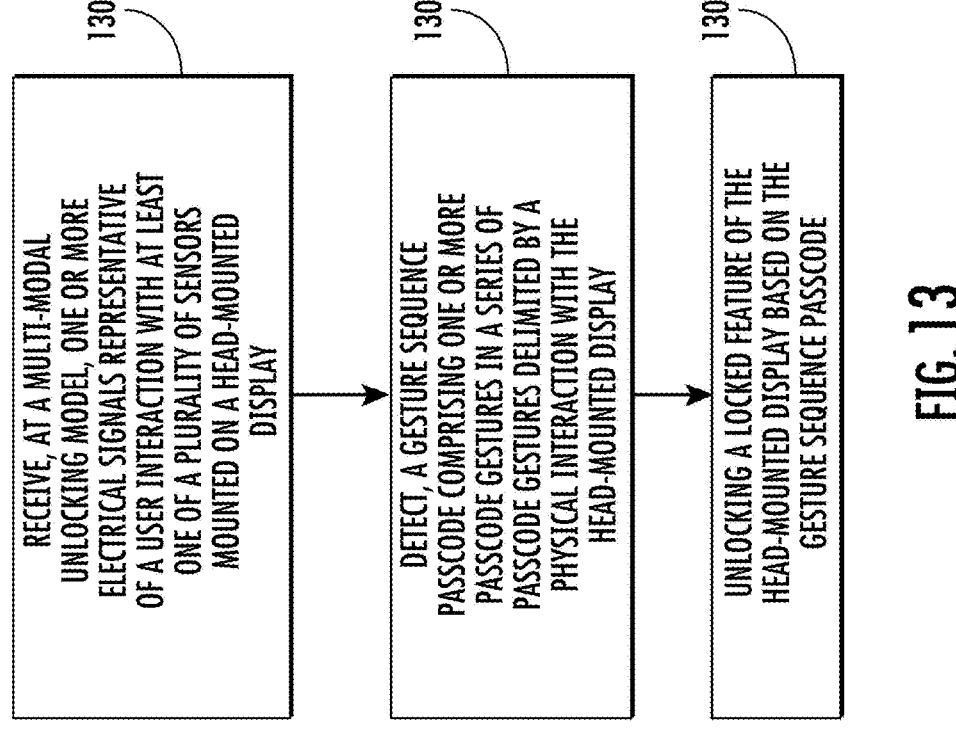

1302

RECEIVE, AT A MULTI-MODAL UNLOCKING MODEL, ONE OR MORE ELECTRICAL SIGNALS REPRESENTATIVE OF A USER INTERACTION WITH AT LEAST ONE OF A PLURALITY OF SENSORS MOUNTED ON A HEAD-MOUNTED DISPLAY

1304

DETECT, A GESTURE SEQUENCE PASSCODE COMPRISING ONE OR MORE PASSCODE GESTURES IN A SERIES OF PASSCODE GESTURES DELIMITED BY A PHYSICAL INTERACTION WITH THE HEAD-MOUNTED DISPLAY

1306

UNLOCKING A LOCKED FEATURE OF THE HEAD-MOUNTED DISPLAY BASED ON THE GESTURE SEQUENCE PASSCODE

MULTI-MODAL GESTURE SEQUENCE PASSCODE UNLOCKING APPARATUS FOR A HEAD-MOUNTED DISPLAY

TECHNOLOGICAL FIELD

Embodiments of the present disclosure relate generally to unlocking locked features on a head-mounted display, and more particularly, to unlocking locked features on a head-mounted display using multi-modal gesture sequence passcode detection.

BACKGROUND

Locking mechanisms are an important aspect of mobile phones, smart glasses, watches, computers, and other similar wearable electronic devices. With the amount of personal information accessible on these devices, locking and unlocking such electronic devices has become more and more important. Head-mounted displays such as virtual reality headsets and smart glasses present unique problems related to locking and unlocking mechanisms.

Applicant has identified many technical challenges and difficulties associated with locking and unlocking a head-mounted display. Through applied effort, ingenuity, and innovation, Applicant has solved problems related to locking and unlocking a head-mounted display by developing solutions embodied in the present disclosure, which are described in detail below.

BRIEF SUMMARY

Various embodiments are directed to an example apparatus, a computer-implemented method, and a computer program product for utilizing a plurality of sensors on a head-mounted display to unlock locked features of the head-mounted display. An example apparatus may include a head-mounted display, a plurality of sensors mounted on the head-mounted display and configured to detect a gesture of a user of the head-mounted display, and a multi-modal unlocking model. The multi-modal unlocking model may further comprise one or more processors and one or more storage devices storing instructions that are operable, when executed by the one or more processors, to cause the one or more processors to detect a gesture sequence passcode comprising one or more passcode gestures in a series of passcode gestures delimited by a physical interaction with the head-mounted display, and unlock a locked feature of the head-mounted display based on the gesture sequence passcode.

In some embodiments, the multi-modal unlocking model is configured to detect a head orientation of the user as at least one of the one or more passcode gestures in the series of passcode gestures comprising the gesture sequence passcode.

In some embodiments, the multi-modal unlocking model is configured to detect an eye state of each eye of the user as at least one of the one or more passcode gestures in the series of passcode gestures comprising the gesture sequence passcode.

In some embodiments, the eye state comprises open or closed.

In some embodiments, the multi-modal unlocking model is configured to detect a heading of the user as at least one of the one or more passcode gestures in the series of passcode gestures comprising the gesture sequence passcode.

In some embodiments, the heading of the user is associated with a relative heading relative to an initial heading.

In some embodiments, the multi-modal unlocking model is configured to detect a hand gesture of the user relative to the head-mounted display as at least one of the one or more passcode gestures in the series of passcode gestures comprising the gesture sequence passcode.

In some embodiments, the hand gesture comprises one or more taps on the head-mounted display.

In some embodiments, the hand gesture comprises detecting a directional contact of the user on a surface of the head-mounted display.

In some embodiments, the hand gesture comprises positioning a hand near a pre-determined location on the head-mounted display.

In some embodiments, the multi-modal unlocking model is configured to detect a facial gesture of the user of the head-mounted display as at least one of the one or more passcode gestures in the series of passcode gestures comprising the gesture sequence passcode.

In some embodiments, the physical interaction comprises physical contact of a hand of the user with the head-mounted display.

In some embodiments, the physical interaction comprises one or more taps on the head-mounted display, or a directional contact of the user on a surface of the head-mounted display.

In some embodiments, the plurality of sensors comprises at least a head orientation sensor, an electric charge variation sensor, a proximity sensor, or an ambient light sensor.

In some embodiments, the head orientation sensor comprises an inertial measurement unit.

In some embodiments, the multi-modal unlocking model is further configured to detect a delete gesture and delete at least one of the one or more passcode gestures in the series of passcode gestures based on the delete gesture.

In some embodiments, at least one of the one or more passcode gestures in the series of passcode gestures includes a plurality of gesture states.

In some embodiments, the multi-modal unlocking model is configured to detect an initiate passcode gesture, indicating a start of the gesture sequence passcode.

A computer-implemented method for unlocking locked features of a head-mounted display using a plurality of sensors on the head-mounted display is further provided. In some embodiments, the computer-implemented method may include receiving, at a multi-modal unlocking model, one or more electrical signals representative of a user interaction with at least one of the plurality of sensors mounted on the head-mounted display. The computer-implement method further comprising detecting, a gesture sequence passcode comprising one or more passcode gestures in a series of passcode gestures delimited by a physical interaction with the head-mounted display. The computer-implemented method further comprising unlocking a locked feature of the head-mounted display based on the gesture sequence passcode.

A computer program product for unlocking locked features of a head-mounted display using a plurality of sensors on the head-mounted display is further provided. The computer program product comprising at least one non-transitory computer-readable storage medium having computer-readable program code portions stored therein, the computer-readable program code portions comprising an executable portion configured to receive, at a multi-modal unlocking model, one or more electrical signals representative of a user interaction with at least one of the plurality of sensors mounted on the head-mounted display. The executable portion further configured to detect a gesture sequence passcode comprising one or more passcode gestures in a series of passcode gestures delimited by a physical interaction with the head-mounted display. The executable portion further configured to unlock a locked feature of the head-mounted display based on the gesture sequence passcode.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIG. 13 illustrates a process depicting example operations for unlocking a head-mounted display using a multi-modal unlocking model in accordance with an example embodiment of the present disclosure.

DETAILED DESCRIPTION

Figure 1:
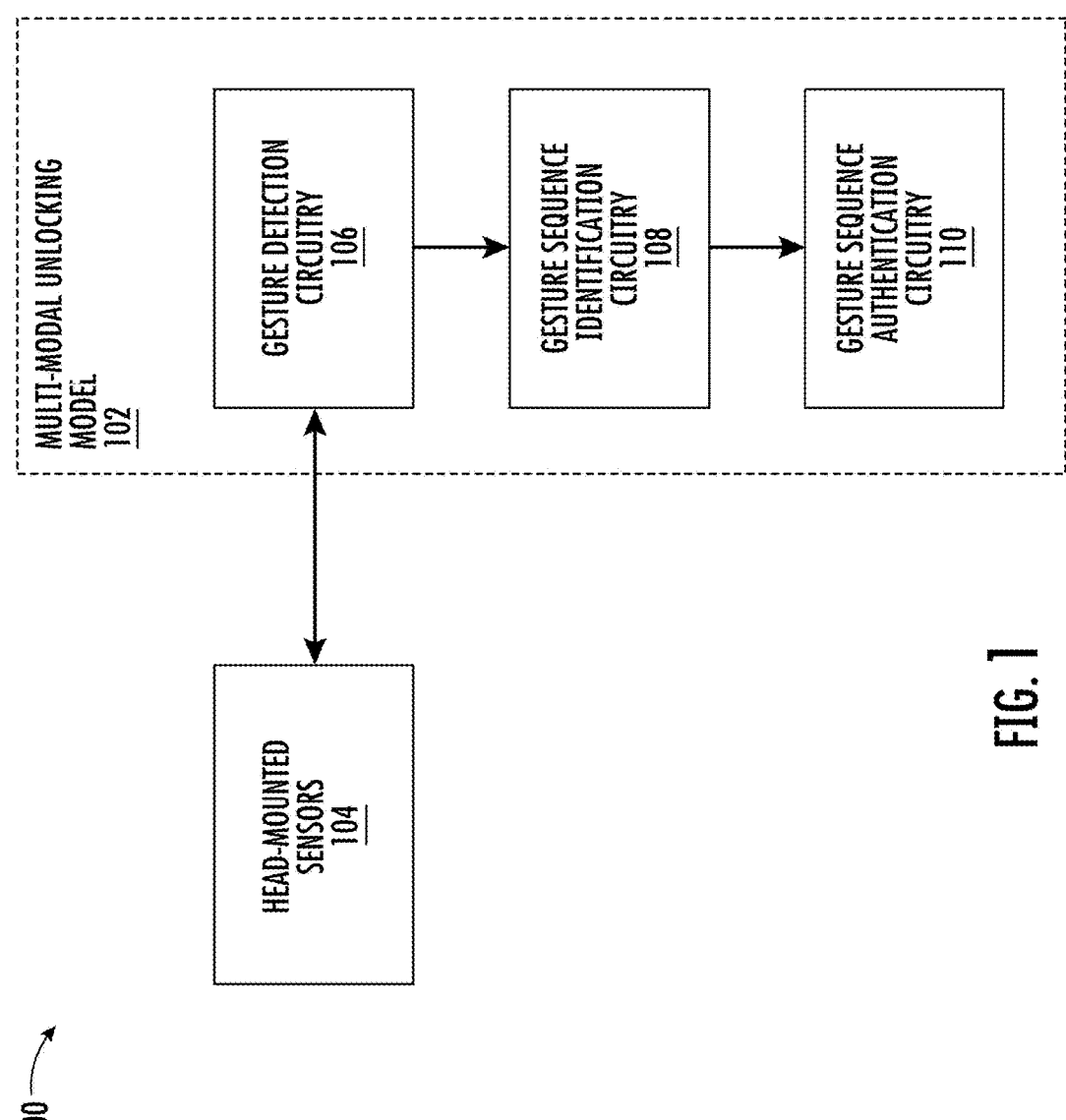
FIG. 1 depicts a block diagram of an example head-mounted, multi-modal unlocking apparatus in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Various example embodiments address technical problems associated with locking and unlocking a head-mounted display without the use of a text input device, fingerprint scanner, retina scanner, or similar biometric authentication device. As will be appreciated, there are numerous example scenarios in which a user may need to unlock a head-mounted display without access to a text input device, such as a keyboard or touch screen, or other biometric authentication device.

Locking mechanisms are an important aspect of mobile phones, smart glasses, watches, computers, and other similar personal electronic devices. With the amount of personal information accessible on these personal electronic devices, locking and unlocking these has become more and more important. Personal electronic devices regularly utilize locking mechanisms such as passwords, personal identification number (PIN) codes, fingerprint scanners, facial recognition, and even retina scanners to limit access to digital content on an electronic device to authorized users.

Head-mounted displays such as virtual reality headsets and smart glasses are becoming more prevalent. Many of these head-mounted displays enable the performance of many of the functions performed on a smart phone. For example, head-worn devices may enable a user to send and receive messages, receive notifications, access the internet, access personal accounts, capture and view photos and videos, and more. As such, there is an increased need for digital locking mechanisms on head-worn devices.

Many traditional locking mechanisms, such as passwords and pin codes, require an input mechanism, such as a touch screen, keyboard, controller, or the like to input the password or pin code. Additionally, other traditional locking mechanisms may perform facial recognition, fingerprint scanning, or retina scanning to identify a user. These mechanisms may be impossible or cumbersome in a head-worn device. For example, a head-worn device may not include a touch screen, controller, or other input device. In addition, sensors, such as optical sensors, fingerprint scanners, and retina scanners may occupy space, add weight, and increase power usage. For a wearable device, such as a head-mounted display, manufacturers are looking to decrease the size and weight of electrical components while prolonging battery life. Biometric sensors also carry a certain risk of privacy invasion and identity theft. Further, individual identifying features, such as retina and fingerprint scans may make sharing of these devices difficult.

As such, there is a need for an unlocking mechanism utilizing the available sensors of the head-worn device that provides adequate security, enabling only authorized users to access the device, and protects the privacy of the users. Utilizing the available sensors reduces the space and power resources dedicated to unlocking a wearable device. In addition, an unlocking mechanism utilizing non-biometric sensors for identification may protect the privacy of users. Further, benefits may be gained by an unlocking mechanism that may be shared with others.

The various example embodiments described herein provide a multi-modal, gesture-based unlocking mechanism for a head-mounted display utilizing multiple sensors to recognize passcode gestures as a part of a gesture sequence passcode.

A head-mounted display may include numerous sensors to support various functionality of the head-mounted display. For example, a head-mounted display may include any combination of inertial measurement units (IMU), accelerometers, gyroscopes, magnetometers, proximity sensors, ambient light sensors, electric charge variation sensors, and so on. Each device is configured to sense various physical characteristics of the surrounding environment. For example, the electric charge variation sensor may be configured to detect the change in the electric charge of a nearby surface. An IMU may be used to detect the specific force of the head-mounted display, the angular rate of the head-mounted display, or even the orientation of the head-mounted display. A magnetometer may be able to detect the heading of the head-mounted display in relation to the Earth's magnetic field and/or relative to a previous heading. Ambient light sensors may be able to detect the amount of light in a surrounding environment. A proximity sensor may detect the presence and/or motion of objects near the head-mounted display.

Various embodiments described herein may utilize the sensors of the head-mounted display to detect gestures performed by the user of the head-mounted display. A gesture is any movement of a part of the body of the user, for example, the head, hand, face, eyes, and so on. The various sensors of the head-mounted display may be configured to recognize gestures of the user. For example, the electric charge variation sensor may be used to detect facial gestures, such as, blinks, raised eyebrows, squinting eyes, and even facial expressions, such as smiles and frowns. The IMU may utilize a gyroscope and accelerometer to determine an orientation of the head of the user. The magnetometer in conjunction with IMU may be used to determine the direction the user's head is facing. Hand gestures may further be detected by the ambient light sensor, the proximity sensor, and even the electric charge variation sensor.

One or more gestures may be detected by a multi-modal unlocking model and recognized as passcode gestures. In some embodiments, a user may register a sequence of passcode gestures as a gesture sequence passcode. In an instance in which the head-mounted display is locked, the user may perform the sequence of passcode gestures to unlock one or more locked features of the head-mounted display. Recognition of the sequence of passcode gestures as a match to the registered gesture sequence code provides the authentication necessary to unlock the one or more locked features.

A multi-modal unlocking model may further be configured to recognize physical interaction delimiters between the passcode gestures. For example, a user may tap the head-mounted display or raise the head-mounted display to distinguish between passcode gestures. In addition, in some embodiments, an initiate passcode gesture may be detected to indicate the start of a gesture sequence passcode. In some embodiments, a plurality of gesture states may be registered as a passcode gesture. For example, a passcode gesture in the gesture sequence passcode may comprise the user sliding a hand along the frame of the head-mounted display and blinking both eyes.

As a result of the herein described example embodiments and in some examples, the secure operation of a head-mounted display may be greatly improved. Utilizing multiple sensors to recognize various gestures in a gesture sequence code may improve the security of a head-mounted display. For example, numerous types of gestures, including hand gestures, head orientation gestures, facial gestures, and so on may be combined in any order or combination, leading to millions of possible combinations, thus making the gesture sequence code nearly impossible to guess. In addition, the gestures must be physically performed, making it difficult for an automated system to attempt a brute force hack of the head-mounted display. Further, the combination of gesture states and the discrete nature of many of the gestures make it difficult for an onlooker to observe and replicate the passcode.

In addition, utilizing existing sensors on the head-mounted display may reduce the size and weight of the head-mounted display, while prolonging battery life. Many sensors are disposed on a head-mounted display to support numerous functions of the device. In addition, commonly used authentication devices such as fingerprint scanners, retina scanners, and cameras for facial detection may be bulky and utilize significant power resources. By using low size and power sensors with additional functionality available to the head-mounted display, significant improvements to the battery utilization and reductions in size of the head-mounted display may be made while still supporting security.

Further, gesture sequence passcodes comprising passcode gestures may be shared with trusted users. Gesture-based passcode sequences do not rely on biometric features unique to an individual. As such, gesture sequence passcodes may be taught and shared with other users of the head-mounted display, supporting the collaboration of more than one individual on a wearable device.

Example Apparatus

Referring now to FIG. 1, a block diagram of an example head-mounted, multi-modal unlocking apparatus 100 is provided. As depicted in FIG. 1, a multi-modal unlocking model 102 is communicatively connected to a plurality of head-mounted sensors 104. The depicted multi-modal unlocking model 102 comprises gesture detection circuitry 106, gesture sequence identification circuitry 108, and gesture sequence authentication circuitry 110.

As depicted in FIG. 1, the example head-mounted, multi-modal unlocking apparatus includes a plurality of head-mounted sensors 104. A head-mounted sensor 104 is any electrical, mechanical, and/or electro-mechanical device mounted on a surface, or within a structure of a head-mounted display and configured to measure a property of the physical environment and transmit an electrical signal corresponding to the measured physical property. For example, head-mounted sensors 104 may include accelerometers (e.g., accelerometer 534 as described in relation to FIG. 5), gyroscopes (e.g., gyroscope 535 as described in relation to FIG. 5), magnetometers (e.g., magnetometer 536 as described in relation to FIG. 5), IMUs (e.g., inertial measurement unit 550 as described in relation to FIG. 5), electric charge variation sensors (e.g., electric charge variation sensor 533 as described in relation to FIG. 5), ambient light sensors (e.g., ambient light sensors 544 as described in relation to FIG. 5), proximity sensors (e.g., proximity sensor 542 as described in relation to FIG. 5), and so on.

As further depicted in FIG. 1, the example head-mounted, multi-modal unlocking apparatus includes a multi-modal unlocking model 102. A multi-modal unlocking model 102 is any hardware, software, and/or combination thereof configured to receive electrical signals from a plurality of head-mounted sensors 104, detect gestures based on the electrical signals, and authenticate a gesture sequence passcode based on the detected gestures. As depicted in FIG. 1, the example multi-modal unlocking model 102 includes gesture detection circuitry 106, gesture sequence identification circuitry 108, and gesture sequence authentication circuitry 110.

Gesture detection circuitry 106 is any hardware, software, and/or any combination thereof configured to detect gestures of a user of a head-mounted display based on the electrical signals received from one or more head-mounted sensors 104. Gesture detection circuitry 106 may utilize any mechanism, including machine learning mechanisms to recognize user gestures based on the electrical signals of the one or more head-mounted sensors 104. For example, the gesture detection circuitry 106 may identify head orientation gestures, such as a user's head facing down, facing up, facing to the left, or facing to the right. Additional head orientation gestures may include tilting the head to the left, or to the right. Example head orientation gestures are described in relation to FIG. 6. In some embodiments, the gesture detection circuitry 106 may further detect a directional heading of a user wearing a head-mounted display relative to the Earth's magnetic force. For example, the gesture detection circuitry 106 may determine a rotational movement, position, or heading of the head-mounted display in degrees relative to an initial orientation (e.g., 0 degrees, 45 degrees, −45 degrees, 90 degrees, and so on). Example head-mounted display headings are described in relation to FIG. 7. The gesture detection circuitry 106 may further be configured to detect motion gestures, such as head nods, head shakes, head tilts, and so on.

In some embodiments, the gesture detection circuitry 106 may be configured to identify hand gestures based on the electrical signals from the one or more head-mounted sensors 104. For example, gesture detection circuitry 106 may identify the proximity of a hand to the head-mounted display, the orientation of the hand (e.g., open hand, closed fist, spread fingers, etc.), taps by the hand against the head-mounted display, directional contact of the user with the head-mounted display (e.g., sliding a finger forward or backward along a surface of the head-mounted display), and so on. Example hand gestures are described in relation to FIG. 9 and FIG. 10.

In some embodiments, the gesture detection circuitry 106 may be configured to identify facial gestures based on the electrical signals from the one or more head-mounted sensors 104. For example, gesture detection circuitry 106 may identify eye gestures (e.g., right-eye wink, left-eye wink, blinks) and facial gestures (e.g., raised eyebrows, smiles, frowns, etc.). Example facial gestures are described in relation to FIG. 8.

As further depicted in FIG. 1, the example multi-modal unlocking model 102 includes gesture sequence identification circuitry 108. Gesture sequence identification circuitry 108 is any hardware, software, and/or combination thereof configured to detect a gesture sequence passcode based on the gestures identified by the gesture detection circuitry 106. A gesture sequence passcode comprises a sequence of one or more passcode gestures. A passcode gesture is any gesture performed by the user of the head-mounted display recognized by the gesture detection circuitry 106. For example, passcode gestures may include one or more head orientation gestures, one or more hand gestures, one or more facial gestures, or any combination thereof.

A multi-modal unlocking model 102 may utilize two modes, a registration mode and an operation mode. During the registration mode, a user may register a sequence of passcode gestures as a gesture sequence passcode as prompted by the head-mounted display. During the operation mode, the gesture sequence passcode may be used to unlock locked features of the head-mounted display. For example, the head-mounted display may enter into a locked state when the head-mounted display is unused for a predetermined period of time or is taken off (e.g., placed on charging station, etc.) Before a user donning the head-mounted display may view certain information, the user may need to perform the gesture sequence passcode registered during the registration phase.

In some embodiments, the performance of a gesture sequence passcode may be preceded by an initiate passcode gesture. An initiate passcode gesture is any gesture performed by a user to indicate the start of a new gesture sequence passcode. An initiate passcode gesture for example, may be a double-tap on the head-mounted display, sliding a finger forward on the frame of the head-mounted display, covering a pre-determined portion of the head-mounted display, or other similar gesture. The gesture sequence identification circuitry 108, based on the reception of the initiate passcode gesture, may process the subsequent gestures as potential passcode gestures of an attempted gesture sequence passcode.

The passcode gestures of the gesture sequence passcode are further delimited by a physical interaction delimiter. A physical interaction delimiter is any interaction by the user of a head-mounted display with the head-mounted display. A physical interaction can comprise hand gestures, such as one or more taps on the head-mounted display, covering a portion of the head-mounted display, sliding a finger in a directional contact along a surface of the head-mounted display, and so on. Physical interaction delimiters can also include non-contact gestures, for example, a double eye blink. A physical interaction delimiter differentiates passcode gestures in the series of passcode gestures. For example, if a tap on the head-mounted display is a physical interaction delimiter, a user may perform the first passcode gesture, then tap the head-mounted display, perform the second passcode gesture, then tap the head-mounted display, and so on, until the complete gesture sequence passcode is input. The gesture sequence identification circuitry 108, based on the reception of the physical interaction delimiter, may store the delimited gestures as potential passcode gestures in an attempted gesture sequence passcode.

In some embodiments, a delete gesture may be performed by a user of a head-mounted display to delete a previous passcode gesture from the attempted gesture sequence passcode. A delete gesture is any gesture performed by a user to indicate removal of a previous passcode gesture from an attempted gesture sequence passcode. A delete gesture for example, may be a double-tap on the head-mounted display, sliding a finger backward on the frame of the head-mounted display, a head shake, or other similar gesture. The gesture sequence identification circuitry 108, based on the reception of the delete gesture, may remove a previously received gesture as a potential passcode gesture from the attempted gesture sequence passcode.

As further depicted in FIG. 1, the multi-modal unlocking model 102 includes gesture sequence authentication circuitry 110. Gesture sequence authentication circuitry 110 is any hardware, software, and/or combination thereof configured to store a gesture sequence passcode and compare an attempted gesture sequence passcode to the stored gesture sequence passcode. During the registration mode of the head-mounted, multi-modal unlocking apparatus 100, the gesture sequence authentication circuitry 110 stores a captured gesture sequence passcode. Attempts to perform the gesture sequence passcode during operation mode are compared to the stored gesture sequence passcode. In an instance in which the performed gesture sequence passcode matches the stored gesture sequence passcode, the gesture sequence authentication circuitry 110 indicates to the head-mounted display to unlock one or more locked features, based on the gesture sequence passcode entered. In an instance in which the performed gesture sequence passcode does not match the stored gesture sequence passcode, the locked features remain locked.

Figure 2:
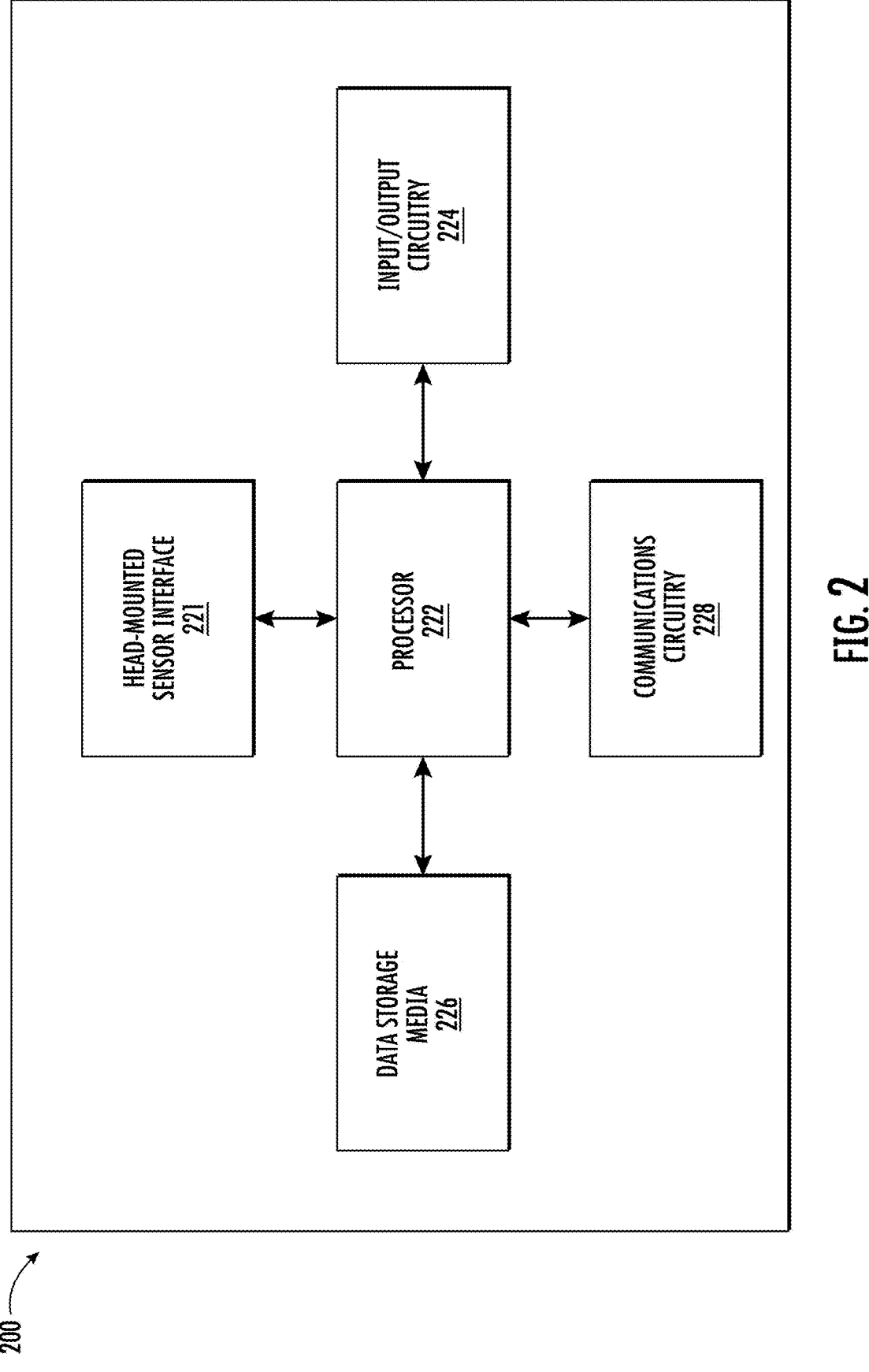
FIG. 2 illustrates a block diagram of an example apparatus that can be specially configured in accordance with an example embodiment of the present disclosure.

Referring now to FIG. 2, FIG. 2 illustrates a block diagram of an example apparatus 200 that can be specially configured in accordance with at least one example embodiment of the present disclosure. Specifically, FIG. 2 illustrates the multi-modal unlocking model 102 in accordance with at least one example embodiment of the present disclosure. The multi-modal unlocking model 102 includes processor 222, data storage media 226, input/output circuitry 224, communications circuitry 228, and head-mounted sensor interface circuitry 221. In some embodiments, the multi-modal unlocking model 102 is configured, using one or more of the sets of circuitry 221, 222, 224, 226, and/or 228, to execute and perform one or more of the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the multi-modal unlocking model 102 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively, or additionally, in some embodiments, other elements of the multi-modal unlocking model 102 provide or supplement the functionality of another particular set of circuitry. For example, the processor 222 in some embodiments provides processing functionality to any of the sets of circuitry, the data storage media 226 provides storage functionality to any of the sets of circuitry, the communications circuitry 228 provides network interface functionality to any of the sets of circuitry, and/or the like.

In some embodiments, the processor 222 (and/or co-processor or any other processing circuitry assisting or otherwise associated with the processor) is/are in communication with the data storage media 226 via a bus for passing information among components of the multi-modal unlocking model 102. In some embodiments, for example, the data storage media 226 is non-transitory and may include, for example, one or more volatile and/or non-volatile memories. In other words, for example, the data storage media 226 in some embodiments includes or embodies an electronic storage device (e.g., a computer readable storage medium). In some embodiments, the data storage media 226 is configured to store information, data, content, applications, instructions, or the like, for enabling the multi-modal unlocking model 102 to carry out various functions in accordance with example embodiments of the present disclosure.

The processor 222 can be embodied in a number of different ways. For example, in some example embodiments, the processor 222 includes one or more processing devices configured to perform independently. Additionally, or alternatively, in some embodiments, the processor 222 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the multi-modal unlocking model 102, and/or one or more remote or "cloud" processor(s) external to the multi-modal unlocking model 102.

In an example embodiment, the processor 222 is configured to execute instructions stored in the data storage media 226 or otherwise accessible to the processor. Alternatively, or additionally, the processor 222 in some embodiments is configured to execute hard-coded functionality. As such, whether configured by hardware or software methods, or by a combination thereof, the processor 222 represents an entity (e.g., physically embodied in circuitry) capable of performing operations according to an embodiment of the present disclosure while configured accordingly. Alternatively, or additionally, as another example in some example embodiments, when the processor 222 is embodied as an executor of software instructions, the instructions specifically configure the processor 222 to perform the algorithms embodied in the specific operations described herein when such instructions are executed. In some embodiments, the processor 222 includes or is embodied by a CPU, microprocessor, and/or the like that executes computer-coded instructions, for example stored via the non-transitory data storage media 226.

In some embodiments, the multi-modal unlocking model 102 includes input/output circuitry 224 that provides output to the user and, in some embodiments, to receive an indication of a user input. In some embodiments, the input/output circuitry 224 is in communication with the processor 222 to provide such functionality. The input/output circuitry 224 may comprise one or more user interface(s) and in some embodiments includes a display that comprises the interface(s) rendered as an electronic interface, a web user interface, an application user interface, a user device, a backend system, or the like. In some embodiments, the input/output circuitry 224 also includes a keyboard, a mouse, a joystick, a touch screen, touch areas, soft keys, a microphone, a speaker, or other input/output mechanisms. The processor 222 and/or input/output circuitry 224 comprising the processor can be configured to control one or more functions of one or more user interface elements through computer program instructions (e.g., software and/or firmware) stored on a memory accessible to the processor (e.g., data storage media 226, and/or the like). In some embodiments, the input/output circuitry 224 includes or utilizes a user-facing application to provide input/output functionality to a client device and/or other display associated with a user. In some embodiments, the input/output circuitry 224 includes hardware, software, firmware, and/or a combination thereof, that facilitates simultaneously display of particular data via a plurality of different devices.

In some embodiments, the multi-modal unlocking model 102 includes communications circuitry 228. The communications circuitry 228 includes any means such as a device or circuitry embodied in either hardware or a combination of hardware and software that is configured to receive and/or transmit data from/to a network and/or any other device, circuitry, or module in communication with the multi-modal unlocking model 102. In this regard, in some embodiments the communications circuitry 228 includes, for example, a network interface for enabling communications with a wired or wireless communications network. Additionally, or alternatively in some embodiments, the communications circuitry 228 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 228 includes circuitry for interacting with the antenna(s) and/or other hardware or software to cause transmission of signals via the antenna(s) or to handle receipt of signals received via the antenna(s). In some embodiments, the communications circuitry 228 enables transmission to and/or receipt of data from a client device, capture device, and/or other external computing device in communication with the multi-modal unlocking model 102.

In some embodiments, the multi-modal unlocking model 102 includes head-mounted sensor interface circuitry 221. The head-mounted sensor interface circuitry 221 includes means such as a device or circuitry embodied in either hardware or a combination of hardware and software that is configured to receive and/or transmit data from/to one or more head-mounted sensors. In this regard, in some embodiments, the head-mounted sensor interface circuitry 221 includes, for example, a communication interface for enabling communication with the one or more head-mounted sensors according to a wired or wireless communications protocol. The head-mounted sensor interface circuitry 221 may further include means to receive analog or digital electrical signals and convert the electrical signals necessary for use throughout the multi-modal unlocking model 102. For example, in some embodiments, the head-mounted sensor interface circuitry 221 may receive an analog electrical signal representative of the physical characteristics observed by the one or more head-mounted sensors and convert the electrical signal to a digital representation of the physical characteristic.

Additionally, or alternatively, in some embodiments, two or more of the sets of circuitries 221-228 are combinable. Alternatively, or additionally, in some embodiments, one or more of the sets of circuitry perform some or all of the functionality described associated with another component. For example, in some embodiments, two or more of the sets of circuitry 221-228 are combined into a single module embodied in hardware, software, firmware, and/or a combination thereof. Similarly, in some embodiments, one or more of the sets of circuitry, is/are combined with the processor 222, such that the processor 222 performs one or more of the operations described above with respect to each of these sets of circuitry 226-228.

Example System

Figure 3:
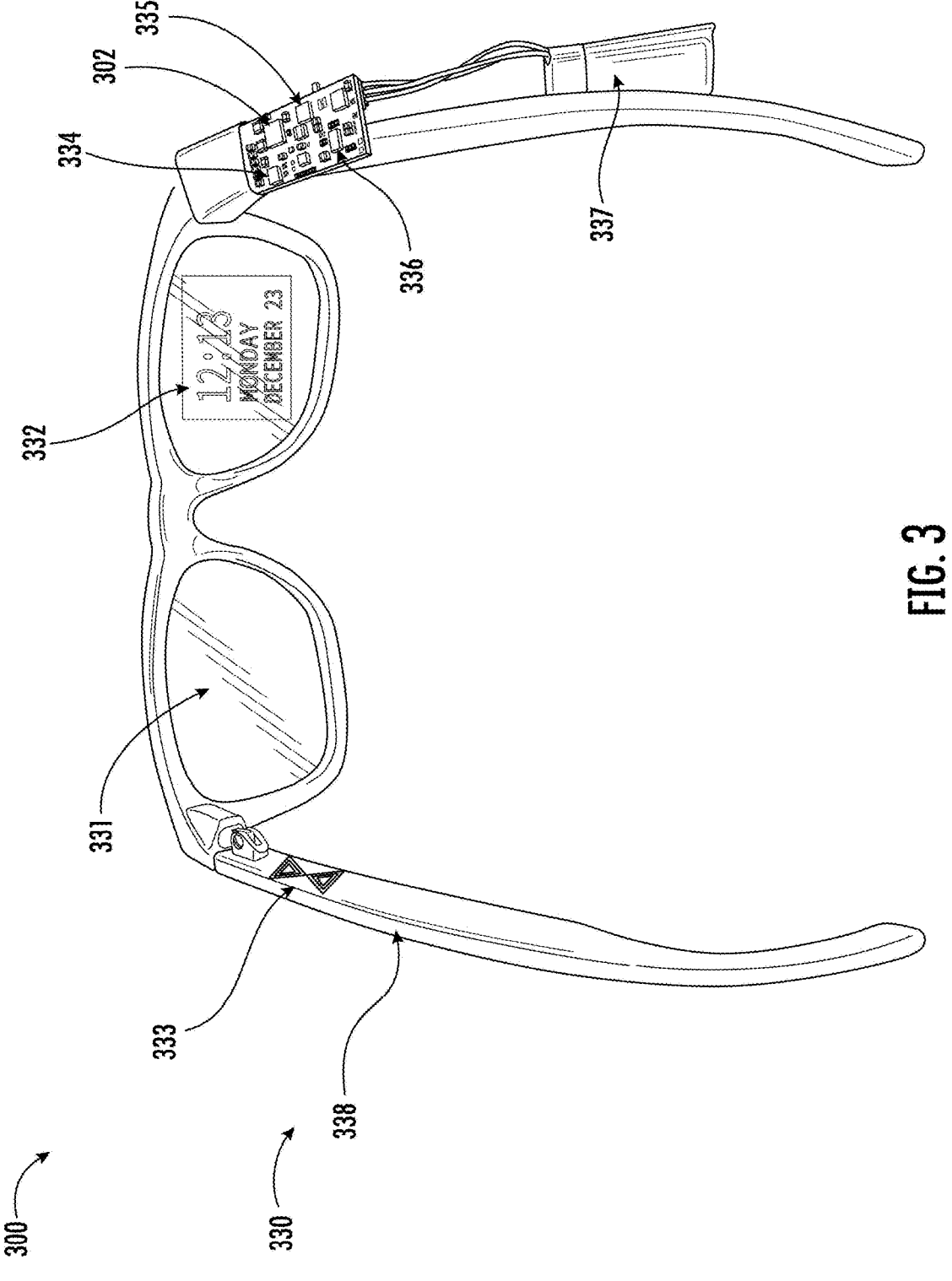
FIG. 3 depicts a perspective view of a head-mounted, multi-modal unlocking apparatus in accordance with an example embodiment of the present disclosure.

Referring now to FIG. 3, a head-mounted display 330 comprising an example embodiment of a head-mounted, multi-modal unlocking apparatus 300 is provided. As depicted in FIG. 3, the head-mounted display 330 includes a frame 338 and lenses 331 configured to display a display interface 332 on one or more of the lenses 331. As further depicted in FIG. 3, a head-mounted, multi-modal unlocking apparatus is incorporated with the head-mounted display 330. The head-mounted, multi-modal unlocking apparatus 300 includes a multi-modal unlocking model 302 and a plurality of head-mounted sensors mounted or otherwise disposed in or on the frame 338 of the head-mounted display 330. The head-mounted sensors depicted in FIG. 3 include an electric charge variation sensor 333, an accelerometer 334, a gyroscope 335, and a magnetometer 336. As further depicted in FIG. 3, the head-mounted display 330 further includes a battery 337.

As depicted in FIG. 3, a head-mounted display 330 is any electronic device worn on the head of a user configured to present a display interface 332 within the field of view of the user. In the depicted embodiment, the head-mounted display 330 includes a frame 338 including two temples, hinges, and a frame front with rims comprising two lenses 331, designed to resemble a pair of glasses. The display interface 332 is presented on one or more of the lenses 331, such that the user may view the display interface 332 while also viewing the surrounding environment. Although primarily depicted as an extended reality display in the depicted embodiment, a head-mounted display 330 may comprise a virtual reality headset, an augmented reality headset, an extended reality headset, a mixed reality headset, smart glasses, heads-up display, or other similar head-mounted visual display device.

As further depicted in FIG. 3, the head-mounted, multi-modal unlocking apparatus 300 of the head-mounted display 330 comprises a plurality of sensors (e.g., electric charge variation sensor 333, an accelerometer 334, a gyroscope 335, and a magnetometer 336) and a multi-modal unlocking model 302. Although primarily depicted as attached to the frame, the plurality of sensors may be encased within the frame 338, attached to one of the lenses 331, incorporated into the structure of the frame 338, or otherwise incorporated into the design of the head-mounted display 330.

As depicted in FIG. 3, the electric charge variation sensor 333 is positioned on the left temple of the frame 338 of the head-mounted display 330. As positioned, the electric charge variation sensor 333 may detect directional contact of a user on the surface of the left temple of the frame 338.

Although depicted in the left temple of the frame 338, the electric charge variation sensor 333 may be positioned anywhere on or in the frame 338 of the head-mounted display 330, such that directional contact, facial gestures, or other gestures may be detected by the electric charge variation sensor 333.

Figure 4:
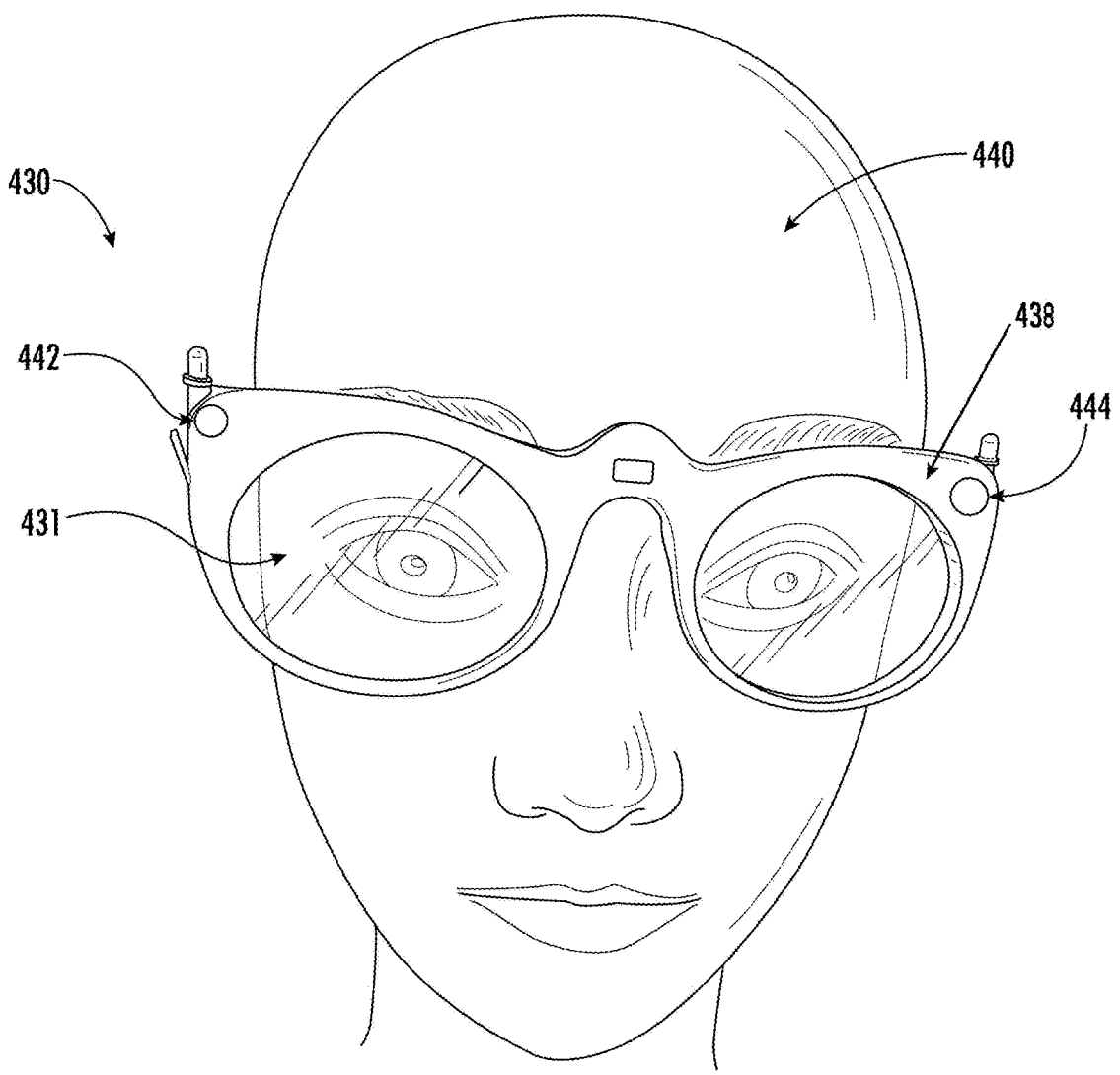
FIG. 4 depicts a front view of a head-mounted, multi-modal unlocking apparatus positioned on a user in accordance with an example embodiment of the present disclosure.

Referring now to FIG. 4, a front view of the head-mounted display 430 in accordance with an example embodiment of the present disclosure is provided. As depicted in FIG. 4, the head-mounted display 430 includes a frame 438 and two lenses 431 and is positioned on the head of a user 440. Additionally, the head-mounted display 430 of FIG. 4 includes a proximity sensor 442 and an ambient light sensor 444 incorporated into the frame 438 of the head-mounted display 430.

As depicted in FIG. 4, the example head-mounted display 430 includes a proximity sensor 442 incorporated into the frame 438 of the head-mounted display 430, such that the proximity sensor 442 is positioned to sense objects and/or motion in close proximity to the frame 438 of the head-mounted display 430 near the right eye of the user 440. Although depicted in the frame 438 near the right eye of the user 440, the proximity sensor 442 may be positioned anywhere on or in the frame 438 of the head-mounted display 430, such that the proximity or motion of an object, such as a hand, may be detected at another surface of the frame 438.

As further depicted in FIG. 4, the example head-mounted display 430 includes an ambient light sensor 444 incorporated into the frame 438 of the head-mounted display 430, such that the ambient light sensor 444 is positioned to sense environment light received at the frame 438 of the head-mounted display 430 near the left eye of the user 440. Although depicted in the frame 438 near the left eye of the user 440, the ambient light sensor 444 may be positioned anywhere on or in the frame 438 of the head-mounted display 430, such that the environment light may be detected at another surface of the frame 438.

Figure 5:
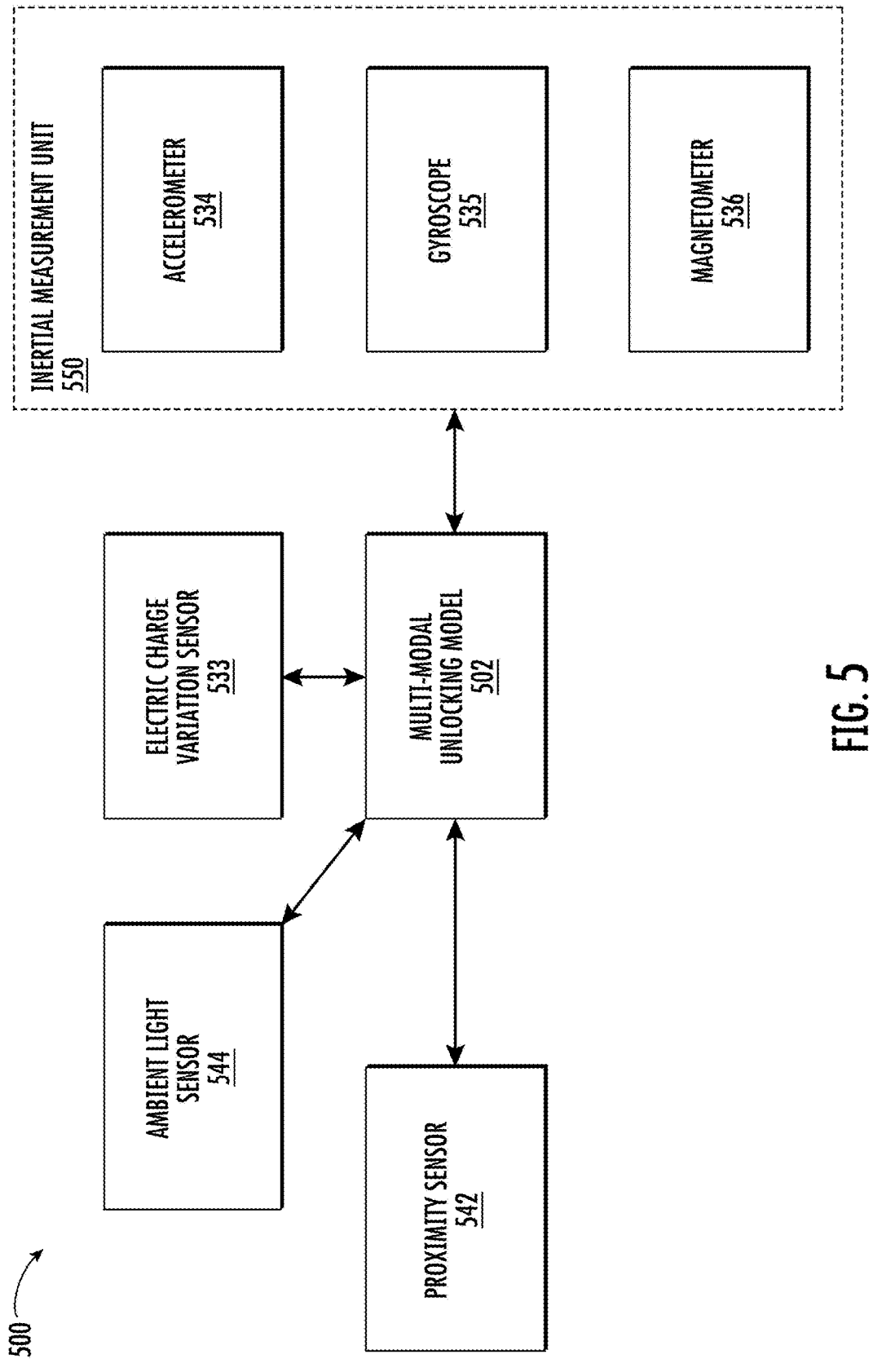
FIG. 5 depicts an example block diagram of a head-mounted, multi-modal unlocking apparatus including a plurality of sensors in accordance with an example embodiment of the present disclosure.

Referring now to FIG. 5, a block diagram of an example embodiment of a head-mounted, multi-modal unlocking apparatus 500 is provided. As depicted in FIG. 5, the example head-mounted, multi-modal unlocking apparatus 500 includes a multi-modal unlocking model 502 communicatively connected to a plurality of sensors, including an electric charge variation sensor 533, a proximity sensor 542, an ambient light sensor 544, and an inertial measurement unit (IMU) 550 comprising an accelerometer 534, a gyroscope 535, and a magnetometer 536.

As depicted in FIG. 5, the example head-mounted, multi-modal unlocking apparatus 500 includes an electric charge variation sensor 533. An electric charge variation sensor 533 is any electrical, mechanical, and/or electro-mechanical device configured to measure an electrostatic charge of a nearby surface and transmit an electrical signal corresponding to the electrostatic charge of the surface generated due to triboelectric effect. When placed on a head-mounted display, an electric charge variation sensor 533 may be used to measure a variety of gestures of a user, including facial gestures, eye gestures, and hand gestures.

For example, an electric charge variation sensor 533 may be placed near the face of the user of the head-mounted display. As the shape of the surface (e.g., the face of the user) changes, so does the electrostatic charge measured by the electric charge variation sensor 533. An electric charge variation sensor 533 placed near the face of the user may be used to detect facial expressions based on the change in shape of the nearby surface, such as raised eyebrows, squinting eyes, smiles, and frowns.

In addition, different surfaces of the face exhibit different electrical charges. For example, the surface of the eyeball may exhibit a different electrical charge than the surface of the eye lid. Thus, eye gestures, such as blinks and winks may be detected by an electric charge variation sensor 533 placed near the eye of a user.

Further, an electric charge variation sensor 533 may be configured to detect motion of a surface across or near the electric charge variation sensor 533. For example, an electric charge variation sensor 533 placed on a surface of the head-mounted display may detect a directional contact of a user across the surface of the head-mounted display on which the electric charge variation sensor 533 is placed. Directional contacts may include sliding a finger forward or backward along the side or temple of the head-mounted display; sliding a finger left or right across the front or bridge of the head-mounted display; or other similar hand gestures.

As further depicted in FIG. 5, the example head-mounted, multi-modal unlocking apparatus 500 includes an ambient light sensor 544. An ambient light sensor 544 is any device, sensor, photodiode, semiconductor device, or other structure that produces an electric current corresponding to the intensity of light received at the ambient light sensor 544. In some embodiments, the ambient light sensor 544 may be a light sensitive semiconductor diode that creates an electrical current proportional to the intensity of the light received at the ambient light sensor 544. When placed on a head-mounted display, an ambient light sensor 544 may be used to measure a variety of gestures of a user, including hand gestures.

For example, an ambient light sensor 544 may be placed on a surface of the head-mounted display facing away from the user, such as on the front surface, bridge, or acetate of the head-mounted display. In addition to detecting the ambient light for functional purposes, such as adjusting the brightness of the display interface, the ambient light sensor 544 may detect hand gestures near the ambient light sensor 544. For example, a user could cover the ambient light sensor 544 by placing a hand over the surface on which the ambient light sensor 544 is disposed. In addition, the ambient light sensor 544 may be configured to recognize the orientation of the hand based on the amount of light received at the ambient light sensor 544. A first near the ambient light sensor 544 may result in a different electrical output from the ambient light sensor 544 than an open hand. Further, an open hand with spread fingers may result in a different electrical output from the ambient light sensor 544 than an open hand with closed fingers.

As further depicted in FIG. 5, the example head-mounted, multi-modal unlocking apparatus 500 includes a proximity sensor 542. A proximity sensor 542 is any electrical, mechanical, and/or electro-mechanical device configured to output an electrical signal representative of the proximity of one or more objects to the proximity sensor 542. In some embodiments, the proximity of an object may be measured by generating pulsed or continuous wave ranging optical radiation, receiving the reflected pulsed or continuous wave ranging optical radiation off the surface of an object, and using the time-of-flight of the pulsed or continuous wave ranging optical radiation to determine the distance, motion, and/or other similar characteristics related to the position of the object near the proximity sensor 542.

In some embodiments, the proximity sensor 542 may contain an array of sensing elements, for example, a multi-zone and/or multi-pixel time of flight sensor. A multi-zone and/or multi-pixel time of flight sensor comprising a plurality of sensing elements, may enable the detection of gestures relative to the proximity sensor 542. For example, the proximity sensor 542 may be configured to detect a swiping motion of the hand in front of the proximity sensor 542 (e.g., right to left swiping motion, up to down swiping motion, etc.) When placed on a surface of the head-mounted display, the proximity sensor 542 may be utilized to measure a variety of gestures of the user, including hand gestures. For example, a user could cover the proximity sensor 542 by placing a hand over the surface on which the proximity sensor 542 is disposed. The user could also wave and/or swipe a hand proximate the proximity sensor 542.

As further depicted in FIG. 5, the example head-mounted, multi-modal unlocking apparatus 500 includes an accelerometer 534, gyroscope 535, and magnetometer 536 in an IMU 550. Although shown collectively comprising an IMU 550, a head-mounted, multi-modal unlocking apparatus 500 may include one or more accelerometers 534, gyroscopes 535, and/or magnetometers 536 deployed for individual data capture. For example, an accelerometer 534, gyroscope 535, and/or magnetometer 536 may be configured individually to detect certain motions of the head-mounted device or the user wearing the head-mounted device, including certain head gestures, head orientations, hand gestures, and other similar movements of the user.

As depicted in FIG. 5, the accelerometer 534, gyroscope 535, and magnetometer 536 may collectively comprise an IMU 550. An IMU 550 is any device configured to determine the specific force, the angular rate, and/or the orientation of the head-mounted display. In some embodiments, an IMU 550 may be configured to perform the functionality of a head orientation sensor. A head orientation sensor is any head-mounted sensor configured to determine the orientation of the head of the user wearing a device comprising the head-mounted sensor. A head orientation sensor may be configured to determine certain head gestures, head positions, a heading of the user, or other similar characteristics related to the orientation of the head of the user. An IMU 550 and or one or more of the collective components individually may be configured to further determine hand gestures performed by the user of the head-mounted display.

A head orientation sensor, for example, the IMU 550 of FIG. 5 may be configured to determine the position of the head of the user. By mounting the IMU 550 on or within the head-mounted display, the IMU 550 may determine gestures related to the position of the head. Head position gestures may include facing down, facing up, facing to the left, facing to the right, or other similar head orientation gestures.

A head orientation sensor, or IMU 550 may be further configured to determine head gestures based on the motion of the head. For example, an IMU 550 placed on or in the head-mounted display may be configured to detect head shakes, head nods, and other motion of the head.

A head orientation sensor, or IMU 550 may be further configured to determine headings based on the position of the head-mounted display. For example, an IMU 550 placed on or in the head-mounted display may be configured to determine the rotation of the head-mounted display with respect to a previous position of the head-mounted display. For example, in some embodiments, rotation determinations may be represented by degrees relative to initial orientation, for example, 0 degrees, 45 degrees, −45 degrees, 90 degrees, −90 degrees, and so on.

An IMU 550 may be further configured to determine hand gestures. For example, an IMU 550 may be configured to determine certain physical interactions with the head-mounted display comprising the IMU 550, such as taps, raising or lowering the head-mounted display, or similar interactions. For example, an IMU 550 may utilize an accelerometer 534, gyroscope 535, and/or magnetometer 536 collectively or individually to identify a tap, double-tap, and so on, on a surface of the head-mounted display. The IMU 550 may further utilize an accelerometer 534, gyroscope 535, and/or magnetometer 536 collectively or individually to identify additional physical interactions, such as shaking the head-mounted display, raising the head-mounted display, lowering the head-mounted display, and so on.

Figure 6:
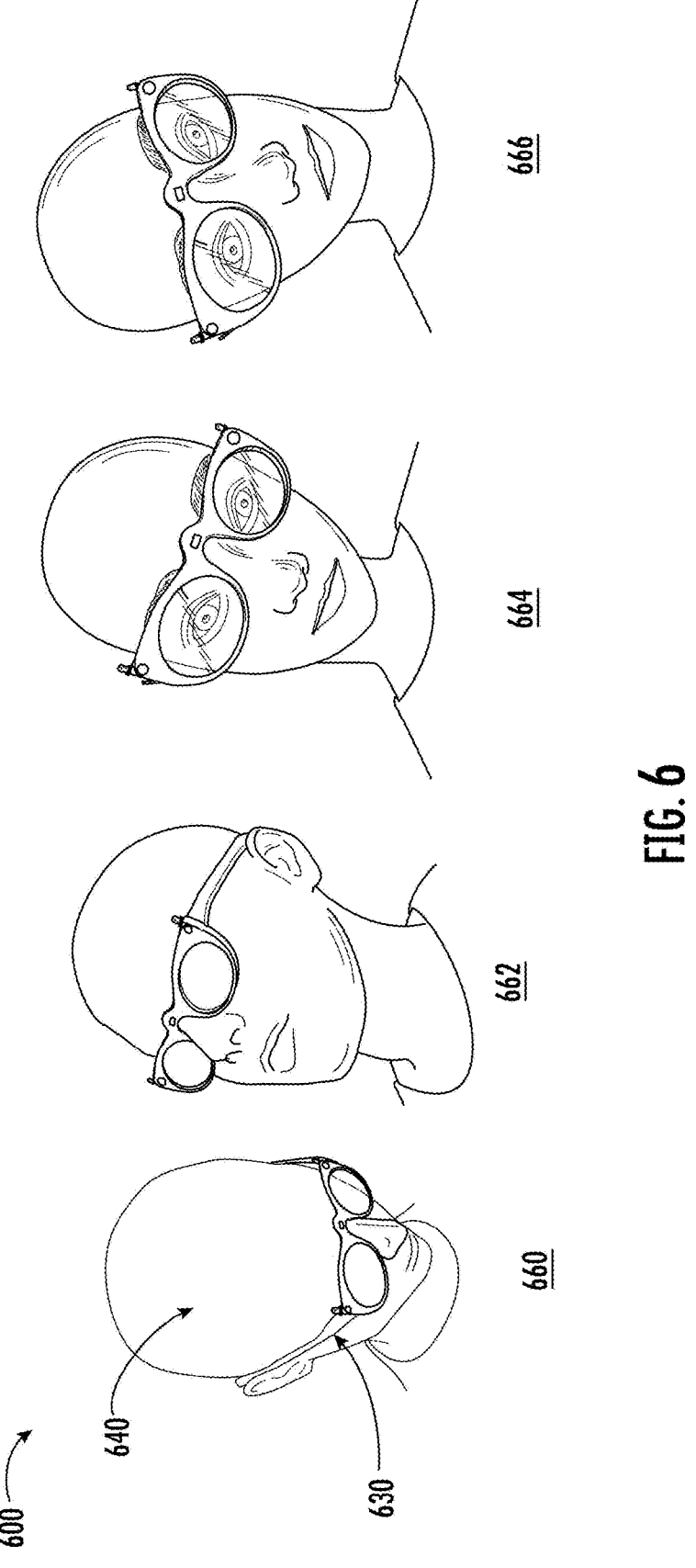
FIG. 6 depicts example head orientations of a user wearing a head-mounted, multi-modal unlocking apparatus in accordance with an example embodiment of the present disclosure.

Referring now to FIG. 6, a series of example head orientations 600 are provided. As depicted in FIG. 6, a user 640 wearing a head-mounted display 630 may perform various head gestures by changing the position of the head. For example, a user 640 may look down 660 (e.g., head facing down), look up 662 (e.g., head facing up), the user may tilt their head to the left 664, the user may tilt their head to the right 666, and so on. Although only four head orientations 600 are depicted in FIG. 6, any number of head orientations 600 may be identified by a head-mounted display 630 utilizing a head-mounted, multi-modal unlocking apparatus as described herein.

Figure 7:
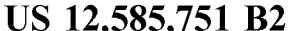
FIG. 7 illustrates example headings of a user wearing a head-mounted, multi-modal unlocking apparatus in accordance with an example embodiment of the present disclosure.

Referring now to FIG. 7, a series of example headings 700 of a user 740 wearing a head-mounted display 730 are provided. A heading relative to the initial position of a user 740 may be determined based on heading. For example, a user may turn to the left, turn to the right, or turn around. Based on an initial heading, one or more head-mounted sensor may determine a subsequent relative heading. As depicted in FIG. 7, a user 740 wearing a head-mounted display 730 may change the heading of their head relative to an initial heading to perform various head gestures. For example, a user 740 may turn their head and the attached head-mounted display 730 to a 45 degree position 770 relative to an initial position, turn their head to a −45 degree position 772 relative to an initial position, turn to a 90 degree position 774 relative to an initial position, or turn to a −90 degree position 776 relative to an initial position. Although only four example headings 700 are depicted in FIG. 7, any number of headings 700 may be identified by a head-mounted display 730 utilizing a head-mounted, multi-modal unlocking apparatus as described herein.

In addition to the head orientation gestures (e.g., head orientations 600 depicted in FIG. 6) and heading gestures (e.g., headings 700 of FIG. 7) depicted in FIG. 7, various head motion gestures, such as shakes of the head, nods of the head, spinning, turning around, and so on may be detected by one or more head-mounted sensors of the head-mounted, multi-modal unlocking apparatus.

Figure 8:
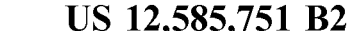
FIG. 8 illustrates example eye gestures of a user wearing a head-mounted, multi-modal unlocking apparatus in accordance with an example embodiment of the present disclosure.

Referring now to FIG. 8, a series of example facial gestures 800 detectable by one or more head-mounted sensors of the head-mounted, multi-modal unlocking apparatus are provided. As depicted in FIG. 8, a user 840 wearing a head-mounted display 830 may perform facial gestures, such as the eye gestures. A head-mounted, multi-modal unlocking apparatus may be configured to determine one or more eye states of each eye of a user 840. Eye states may include eye open 883, eye closed 881, squinted eyes, or other similar eye gestures. Based on the detected eye states, a user 840 may perform one or more eye gestures, for example, eyes open 880, right eye wink 882, left eye wink 884, and eyes closed 886 as depicted in FIG. 8. Although only four example facial gestures 800 are depicted in FIG. 8, any number of facial gestures 800 may be identified by a head-mounted display 830 utilizing a head-mounted, multi-modal unlocking apparatus as described herein.

Figure 9:
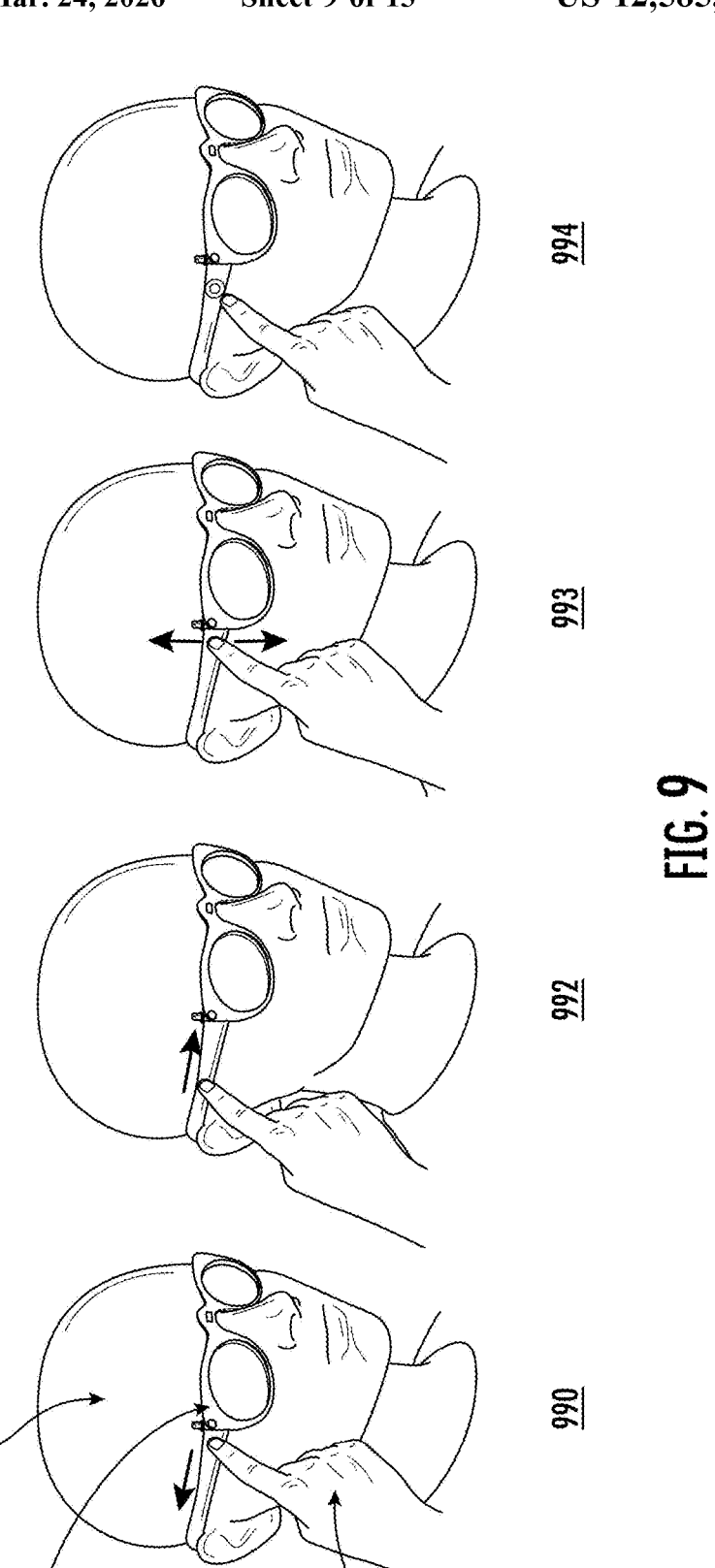
FIG. 9 illustrates example hand gestures of a user relative to the head-mounted, multi-modal unlocking apparatus in accordance with an example embodiment of the present disclosure.

Referring now to FIG. 9, a series of example hand gestures 900 detectable by one or more head-mounted sensors of the head-mounted, multi-modal unlocking apparatus are provided. A head-mounted, multi-modal unlocking apparatus may be configured to detect one or more physical interactions with the head-mounted display 930. For example, a head-mounted, multi-modal unlocking apparatus may be configured to determine directional contact of the hand or finger 996 of the user along a surface of the head-mounted display 930. Directional contact may include a slide backward motion 990 along the surface of the head-mounted display 930, a slide forward motion 992 along the surface of the head-mounted display 930, a vertical slide 993 up or down along the surface of the head-mounted display 930, or other similar motion. Additional physical interactions with the head-mounted display may include a tap 994 on a surface of the head-mounted display 930 as depicted in FIG. 9. Although only four example hand gestures 900 are depicted in FIG. 9, any number of hand gestures 900 may be identified by a head-mounted display 930 utilizing a head-mounted, multi-modal unlocking apparatus as described herein.

Figure 10:
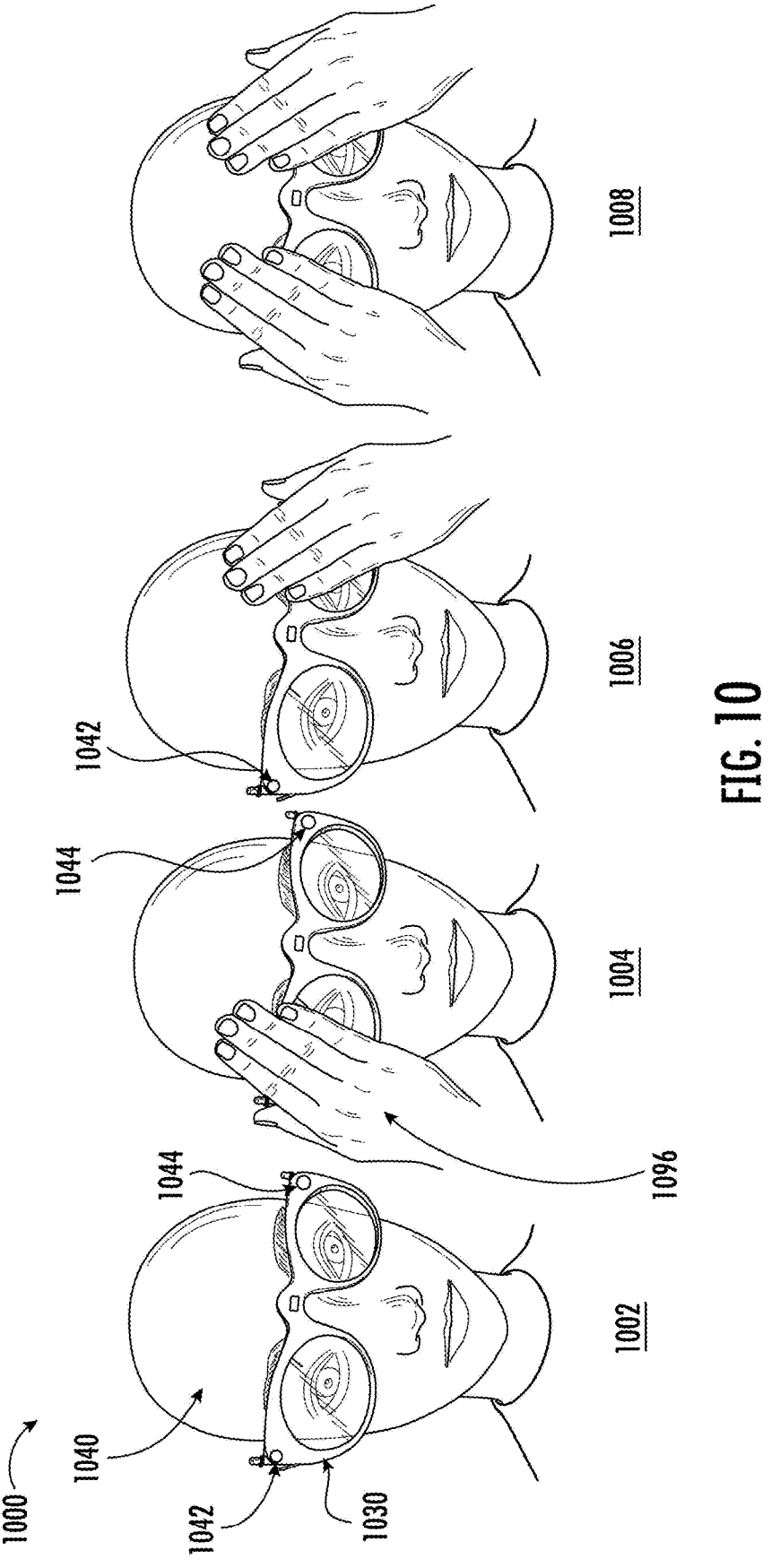
FIG. 10 illustrates additional example hand gestures of a user relative to the head-mounted, multi-modal unlocking apparatus in accordance with an example embodiment of the present disclosure.

Referring now to FIG. 10, a series of additional example hand gestures 1000 detectable by one or more head-mounted sensors of the head-mounted, multi-modal unlocking apparatus are provided. As depicted in FIG. 10, the head-mounted display 1030 includes a proximity sensor 1042 positioned on the frame of the head-mounted display 1030 near the right eye of the user 1040 and an ambient light sensor 1044 positioned on the frame of the head-mounted display 1030 near the left eye of the user 1040. A user 1040 may position their hand on or near either or both of the head-mounted sensors (e.g., proximity sensor 1042, ambient light sensor 1044) to perform a hand gesture (and/or physical interaction with the head-mounted display 1030). Hand gestures may include no hand gesture as depicted in hand gesture 1002, placing a hand 1096 near the right eye as depicted in hand gesture 1004, placing a hand 1096 near the left eye as depicted in hand gesture 1006, or placing one hand 1096 near the right eye and one hand 1096 near the left eye as depicted in hand gesture 1008. Such interactions may be detected as physical interactions with the head-mounted display 1030, for example, for purposes of determining a passcode gesture delimiter. Although only four example additional hand gestures 1000 are depicted in FIG. 10, any number of hand gestures 1000 may be identified by a head-mounted display 1030 utilizing a head-mounted, multi-modal unlocking apparatus as described herein. For example, as described herein, the head-mounted, multi-modal unlocking apparatus may further determine the orientation of the hand (e.g., fist, open palm, spread fingers, etc.)

Figure 11:
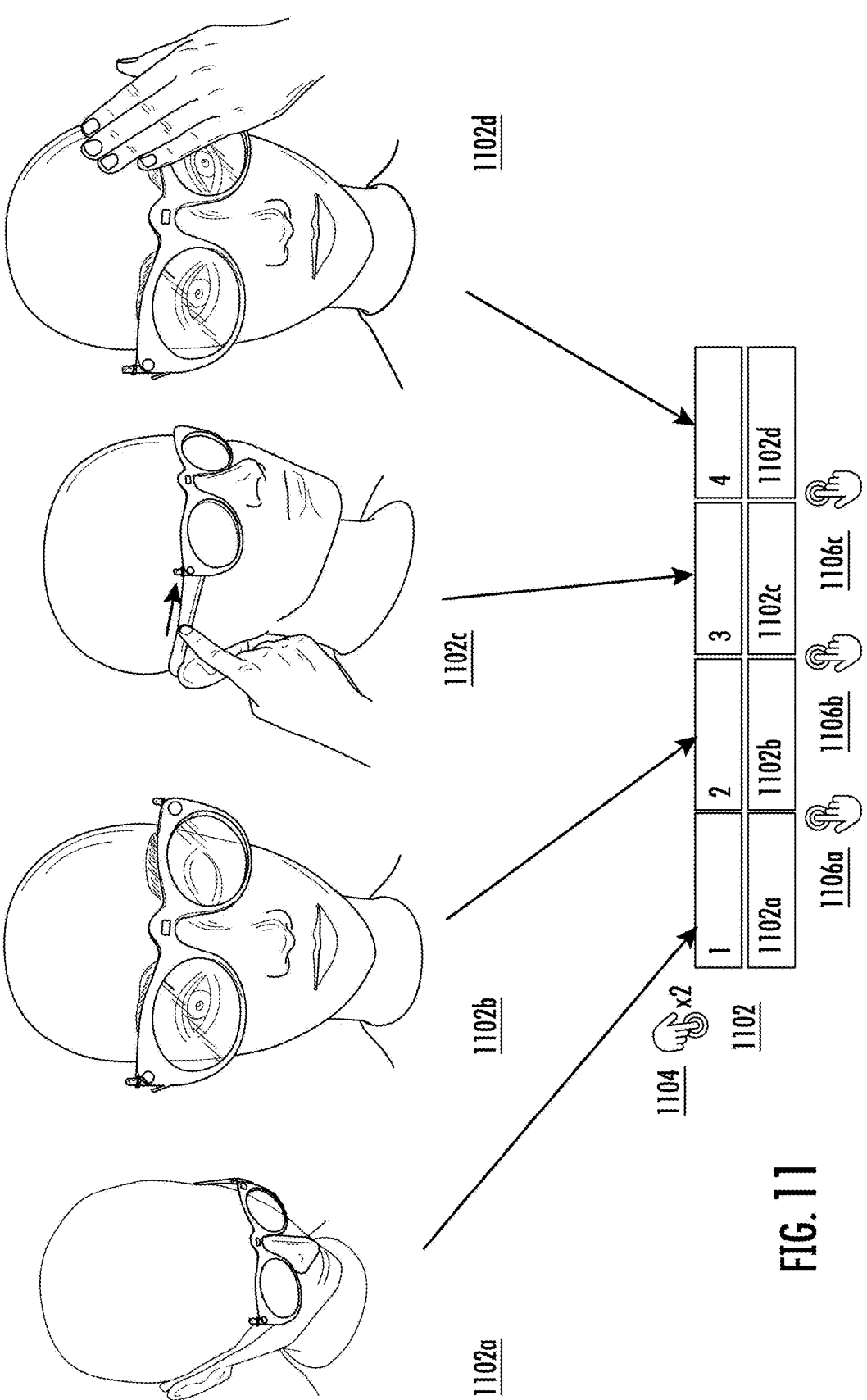
FIG. 11 illustrates an example gesture sequence passcode in accordance with an example embodiment of the present disclosure.

Referring now to FIG. 11, an example gesture sequence passcode 1102 comprising a series of example passcode gestures 1102a-1102d is provided. As depicted in FIG. 11, the example gesture sequence passcode 1102 comprises a series of four passcode gestures 1102a-1102d, each delimited by a physical interaction delimiter 1106a-1106c. In addition, an initiate passcode gesture 1104 is depicted as indicating the start of the gesture sequence passcode 1102.

As depicted in FIG. 11, a head-mounted display may be configured with a head-mounted, multi-modal unlocking apparatus comprising a multi-modal unlocking model and a plurality of head-mounted sensors to detect a gesture sequence passcode 1102. A gesture sequence passcode 1102 is any series of passcode gestures 1102a-1102d detectable by a multi-modal unlocking model and delimited by a physical interaction delimiter 1106a-1106c, used to lock one or more locked features of a head-mounted display. During registration of a gesture sequence passcode 1102, a user may perform a series of passcode gestures 1102a-1102d delimited by physical interaction delimiters 1106a-1106c to be stored as a saved gesture sequence passcode 1102. During operation of the head-mounted display, the user of the head-mounted display may perform a series of passcode gestures 1102a-1102d delimited by physical interaction delimiters 1106a-1106c in an attempt to unlock one or more locked features of the head-mounted display. In an instance in which the series of passcode gestures 1102a-1102d matches the saved gesture sequence passcode 1102, the locked features are unlocked. However, in an instance in which the gesture sequence passcode 1102 does not match the saved gesture sequence passcode 1102, the locked features of the head-mounted display remain locked. Although depicted as including four passcode gestures 1102a-1102d in FIG. 11, a gesture sequence passcode 1102 may be configured to include any number of passcode gestures (e.g., 4, 8, 16, etc.).

As further depicted in FIG. 11, the gesture sequence passcode 1102 includes a plurality of passcode gestures 1102a-1102d. A passcode gesture 1102a-1102d is any gesture performed by the user of the head-mounted display recognized by the multi-modal unlocking model. Passcode gestures may include one or more head orientation gestures, one or more hand gestures, one or more facial gestures, or any combination thereof. The first passcode gesture 1102a in the depicted gesture sequence passcode 1102 of FIG. 11 includes a head orientation gesture of the user looking down. The second passcode gesture 1102b in the depicted gesture sequence passcode 1102 includes an eye gesture of the user winking the left eye. The third passcode gesture 1102c in the depicted gesture sequence passcode 1102 includes a first hand gesture of the user sliding a finger forward on the temple of the head-mounted display. The fourth passcode gesture 1102d in the depicted gesture sequence passcode 1102 includes a second hand gesture of the user covering a portion of the head-mounted display associated with one or more head-mounted sensors.

As further depicted in FIG. 11, the gesture sequence passcode 1102 includes a physical interaction delimiter 1106a-1106c indicating a delineation between each passcode gesture 1102a-1102d in the performance of the gesture sequence passcode 1102. A physical interaction delimiter is any interaction by the user of a head-mounted display with the head-mounted display. A physical interaction may comprise hand gestures, such as one or more taps on the head-mounted display, covering a portion of the head-mounted display, sliding a finger in a directional contact along a surface of the head-mounted display, and so on. The physical interaction delimiter 1106a-1106 depicted in FIG. 11 is a tap, for example, a tap on the side of the head-mounted display. Thus, a user performing a gesture sequence passcode 1102 may tap the head-mounted display between the performance of passcode gesture 1102a-1102d, indicating the end of one passcode gesture 1102a-1102d and the start of a new passcode gesture 1102a-1102d.

In some embodiments, the multi-modal unlocking model of a head-mounted display may be further configured to recognize one or more delete gestures. A delete gesture may be performed by a user to indicate removal of a previous passcode gesture 1102a-1102d from an attempted gesture sequence passcode 1102. A delete gesture for example, may be a double-tap on the head-mounted display, sliding a finger backward on the frame of the head-mounted display, a head shake, or other similar gesture. The multi-modal unlocking model, based on the reception of the delete gesture, may remove a previously received gesture as a potential passcode gesture from the attempted gesture sequence passcode.

As further depicted in FIG. 11, the gesture sequence passcode 1102 includes an initiate passcode gesture 1104. The initiate passcode gesture 1104 is any gesture performed by a user to indicate the start of a new gesture sequence passcode 1102. An initiate passcode gesture for example, may be a double-tap on the head-mounted display, sliding a finger forward on the frame of the head-mounted display, covering a pre-determined portion of the head-mounted display, or other similar gesture. As depicted in FIG. 11, the initiate passcode gesture 1104 is a double-tap on a surface of the head-mounted display. The multi-modal unlocking model may be configured upon recognition of an initiate passcode gesture 1104 to identify subsequent gestures as potential passcode gestures of an attempted gesture sequence passcode 1102.

Figure 12:
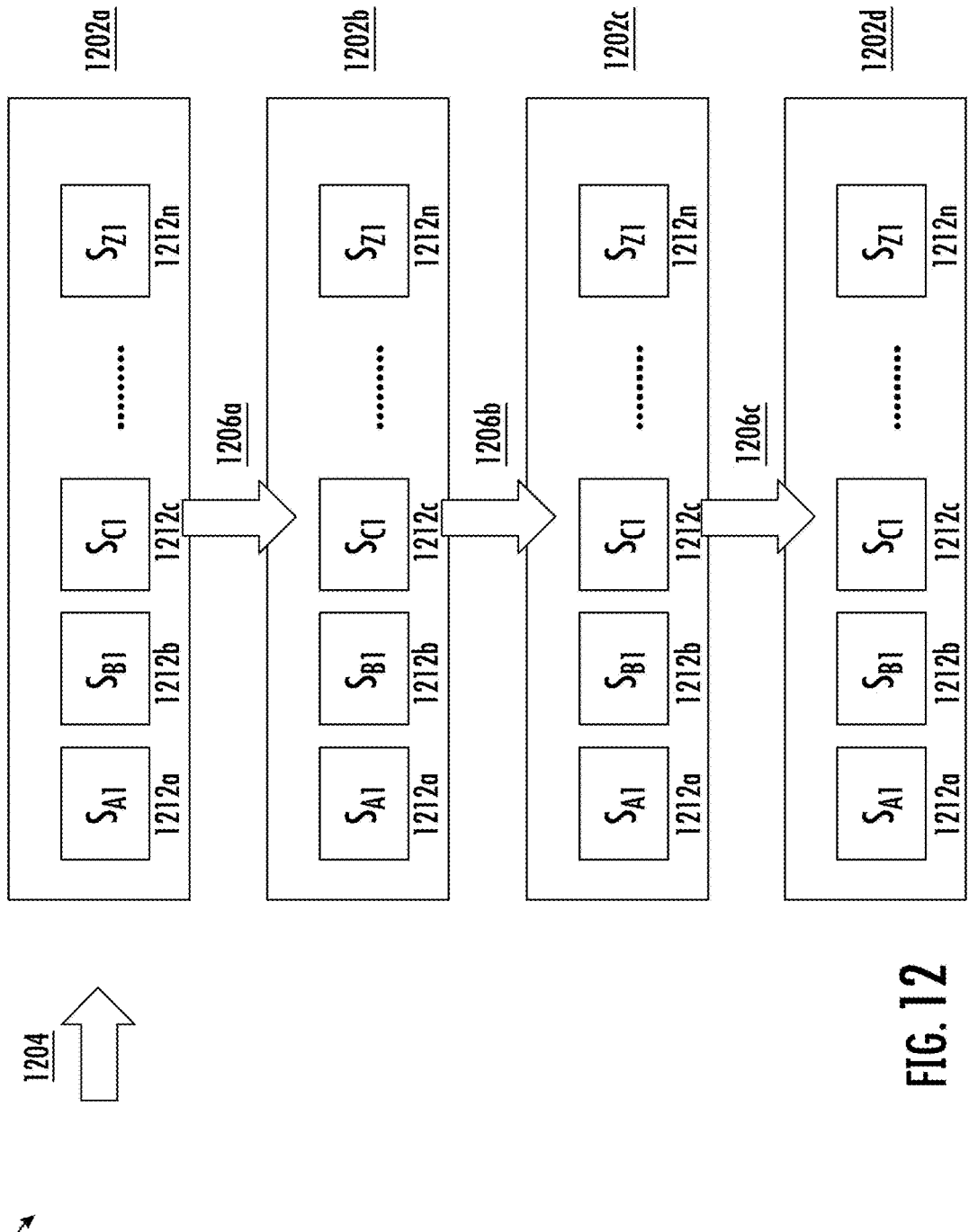
FIG. 12 illustrates an example gesture sequence passcode comprising a plurality of gesture states in each passcode gesture in accordance with an example embodiment of the present disclosure.

Referring now to FIG. 12, an example gesture sequence passcode 1202 comprising four passcode gestures 1202a-1202d, each representing a plurality of gesture states 1212a-1212n is provided. As further depicted in FIG. 12, the generate sequence passcode 1202 is initiated by an initiate passcode gesture 1204 and each passcode gesture 1202a-1202d is delimited by a physical interaction delimiter 1206a-1206c.

As depicted in FIG. 12, each passcode gesture 1202a-1202d comprises a plurality of gesture states 1212a-1212n. In the depicted embodiment of FIG. 12, a passcode gesture 1202a-1202d may include multiple gestures performed simultaneously and delimited by a physical interaction delimiter 1206a-1206c. A gesture state 1212a-1212n is any value representing a state of a particular gesture or set of gestures. In a particular example, a gesture may comprise two states, for example, the eye gesture state of the user's right eye may be either open or closed. In an instance in which the user's right eye is open, the gesture state for the particular gesture may be set to 1, and in an instance in which the user's right eye is closed, the gesture state may be set to 0. In another example, an eye gesture may comprise four states for example, 0 indicates both of the users eyes are closed; 1 indicates the user's right eye is open and the user's left eye is closed; 2 indicates the user's left eye is open and the user's right eye is closed; and 3 indicates both of the user's eyes are open. Thus, the passcode gesture 1202a-1202d may store the state 1212a-1212n for n gestures, where n is the number of simultaneous gestures recorded in the passcode gesture 1202a-1202d.

In a specific illustrative example, a passcode gesture 1202a-1202d may include three gesture states 1212a-1212c. State 1212a may represent the state of the user's eyes (e.g., 0—both eyes closed, 1—right eye open, left eye closed, 2—right eye closed, left eye open, 3—both eyes open). State 1212b may represent the head rotation of the user (e.g., 0-45 degrees, 1--45 degrees, 2-90 degrees, 3--90 degrees). State 1212c may represent the hand placement of the user (e.g., 0—no hands covering the proximity sensor or ambient light sensor, 1—one hand covering the proximity sensor, 2—one hand covering the ambient light sensor, 3—one hand covering the proximity sensor and one hand covering the ambient light sensor). Thus, the state for each passcode gesture 1202a-1202d may be recorded. For example, the plurality of gesture states at 1212a-1212c during passcode gesture 1202a may be 111, during passcode gesture 1202b the plurality of states 1212a-1212c may be 212, during passcode gesture 1202c the plurality of states 1212a-1212c may be 132, and during passcode gesture 1202d the plurality of states 1212a-1212c may be 333.

To correctly perform the gesture sequence passcode 1202 comprising states: 1202a-111; 1202b-212; 1202c-132; 1202d-333; the user may perform the following passcode gestures. First, the user may perform the initiate passcode gesture 1204 (e.g., double-tap the head-mounted display). Next, the user may perform passcode gesture 1202a (111) by performing the eye gesture right eye open, left eye closed, turn to the head by 45 degrees, and cover the proximity sensor, simultaneously; followed by a physical interaction delimiter. Next, the user may perform passcode gesture 1202b (212) by performing the eye gesture right eye closed, left eye open, turn the head by 45 degrees, and cover the ambient light sensor, simultaneously; followed by a physical interaction delimiter (e.g., double eye blink). Next, the user may perform passcode gesture 1202c (132) by performing the eye gesture right eye open, left eye closed, turn the head by –90 degrees, and cover the ambient light sensor, simultaneously; followed by a physical interaction delimiter. Finally, the user may perform passcode gesture 1202d (333) by performing the eye gesture both eyes open, turn the head by –90 degrees, and cover both the proximity sensor and the ambient light sensor, simultaneously.

By enabling a passcode gesture representing multiple gesture states simultaneously, the strength of a gesture sequence passcode 1202 may be significantly increased. In addition, performing multiple gestures simultaneously may be difficult for a bystander to observe and mimic. Particularly in an instance in which certain gestures are hidden from view, for example, eye gestures.

Example Method

Referring now to FIG. 13, an example process 1300 for unlocking one or more locked features of a head-mounted display utilizing a plurality of head-mounted sensors is provided. At block 1302, the multi-modal unlocking model (e.g., multi-modal unlocking model 102, 502) receives one or more electrical signals representative of a user interaction (e.g., gesture) with at least one of a plurality of sensors (e.g., head-mounted sensors 104; electric charge variation sensor 333, 533; accelerometer 334, 534; gyroscope 335, 535; magnetometer 336, 536; proximity sensor 442, 542; ambient light sensor 444, 544; inertial measurement unit 550) mounted on a head-mounted display (e.g., head-mounted display 330, 430, 630, 730, 830, 930, 1030). As described herein, the multi-modal unlocking model may be electrically coupled to a plurality of head-mounted sensors. In some embodiments, the plurality of head-mounted sensors may be existing on a head-mounted display to provide existing functionality. However, the plurality of head-mounted sensors may also sense interactions of the user with the head-mounted display and the surrounding environment. For example, the plurality of head-mounted sensors may sense gestures performed by the user of the head-mounted display.

At block 1304, the multi-modal unlocking model detects, a gesture sequence passcode (e.g., gesture sequence passcode 1102, 1202) comprising one or more passcode gestures (e.g., 1102a-1102d; 1202a-1202d) in a series of passcode gestures delimited by a physical interaction with the head-mounted display (e.g., physical interaction delimiter 1106a-1106c; 1206a-1206c). As described herein, the multi-modal unlocking model may be configured to detect a wide range of gestures based on electrical signals received from the plurality of head-mounted sensors, including head orientation gestures, hand gestures, facial gestures, etc. Each passcode gesture performed by a user may be delimited by a physical interaction, for example, a tap of the head-mounted display, a directional contact along a surface of the head-mounted display, covering a portion of the head-mounted display, or a similar physical interaction.

At block 1306, the multi-modal unlocking model unlocks a locked feature of the head-mounted display based on the gesture sequence passcode. The multi-modal unlocking model may compare a performed series of gestures against the passcode gestures saved as part of a saved gesture sequence passcode during a registration process. In an instance in which the series of gestures matches the gesture sequence passcode, one or more locked features of the head-mounted display may be unlocked. Locked features may include certain notifications displayed on the display interface of the head-mounted display, available applications on the head-mounted display, and so on.

Utilizing a multi-modal unlocking model as an unlocking mechanism for a head-mounted display may greatly improve the security and ease of use of the head-mounted display. For example, utilizing a variety of gestures and even a combination of gestures in a gesture sequence passcode may provide a large number of possible combinations in the gesture sequence passcode, making the gesture sequence passcode difficult to hack. In addition, many of the gestures in a passcode sequence may be hidden or unobvious, making it difficult for an onlooker to mimic the sequence of gestures. In addition, passcodes based on gestures may be easily shared with trusted individuals. Further, utilizing existing sensors on the head-mounted display to recognize passcode gestures enable reductions in the size and weight of the head-mounted display while simultaneously increasing battery life.

While this detailed description has set forth some embodiments of the present invention, the appended claims cover other embodiments of the present invention which differ from the described embodiments according to various modifications and improvements. For example, one skilled in the art may recognize that such principles may be applied to any electronic device that may benefit from a low-power unlocking mechanism relying on multi-function sensing devices to recognize gestures instead of standard input devices such as keyboards, touch screens, and biometric authentication devices. For example, extended reality headsets, virtual reality headsets, augmented reality headsets, mixed reality headsets, smart glasses, smart watches, and other wearable electronic devices.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An apparatus, comprising:
a head-mounted display;
a plurality of sensors mounted on the head-mounted display and configured to detect a gesture of a user of the head-mounted display; and
a multi-modal unlocking model, comprising one or more processors and one or more storage devices storing instructions that are operable, when executed by the one or more processors, to cause the one or more processors to:
detect an initiate passcode gesture, indicating a start of a gesture sequence passcode comprising one or more passcode gestures in a series of passcode gestures;
detect a first passcode gesture in the series of passcode gestures;
detect a physical interaction delimiter between each passcode gesture, wherein the physical interaction delimiter comprises physical contact of a hand of the user with the head-mounted display, and wherein the physical contact comprises one or more taps on the head-mounted display, or a directional contact of the user on a surface of the head-mounted display;
unlock a locked feature of the head-mounted display based on the gesture sequence passcode matching a stored gesture sequence passcode; and
in response to the gesture sequence passcode not matching the stored gesture sequence passcode, the locked feature remains locked.

2. The apparatus of claim 1, wherein the multi-modal unlocking model is configured to detect a head orientation of the user as at least one of the one or more passcode gestures in the series of passcode gestures comprising the gesture sequence passcode.

3. The apparatus of claim 1, wherein the multi-modal unlocking model is configured to detect an eye state of each eye of the user as at least one of the one or more passcode gestures in the series of passcode gestures comprising the gesture sequence passcode.

4. The apparatus of claim 3, wherein the eye state comprises open or closed.

5. The apparatus of claim 1, wherein the multi-modal unlocking model is configured to detect a heading of the user as at least one of the one or more passcode gestures in the series of passcode gestures comprising the gesture sequence passcode.

6. The apparatus of claim 5, wherein the heading of the user is associated with a relative heading relative to an initial heading.

7. The apparatus of claim 1, wherein the multi-modal unlocking model is configured to detect a hand gesture of the user relative to the head-mounted display as at least one of the one or more passcode gestures in the series of passcode gestures comprising the gesture sequence passcode.

8. The apparatus of claim 7, wherein the hand gesture comprises one or more gesture taps on the head-mounted display.

9. The apparatus of claim 7, wherein the hand gesture comprises detecting a gesture directional contact of the user on the surface of the head-mounted display.

10. The apparatus of claim 7, wherein the hand gesture comprises positioning the hand of the user near a predetermined location on the head-mounted display.

11. The apparatus of claim 1, wherein the multi-modal unlocking model is configured to detect a facial gesture of the user of the head-mounted display as at least one of the one or more passcode gestures in the series of passcode gestures comprising the gesture sequence passcode.

12. The apparatus of claim 1, wherein the plurality of sensors comprises at least a head orientation sensor, an electric charge variation sensor, a proximity sensor, or an ambient light sensor.

13. The apparatus of claim 12, wherein the head orientation sensor comprises an inertial measurement unit.

14. The apparatus of claim 1, the multi-modal unlocking model further configured to:

detect a delete gesture; and delete at least one of the one or more passcode gestures in the series of passcode gestures based on the delete gesture.

15. The apparatus of claim 1, wherein at least one of the one or more passcode gestures in the series of passcode gestures includes a plurality of gesture states.

16. A computer-implemented method comprising:

receiving, at a multi-modal unlocking model, one or more electrical signals representative of a user interaction with at least one of a plurality of sensors mounted on a head-mounted display;

detecting an initiate passcode gesture, indicating a start of a gesture sequence passcode comprising one or more passcode gestures in a series of passcode gestures;

detecting a first passcode gesture in the series of passcode gestures;

detecting a physical interaction delimiter between each passcode gesture, wherein the physical interaction delimiter comprises physical contact of a hand of a user with the head-mounted display, and wherein the physical contact comprises one or more taps on the head-mounted display, or a directional contact of the user on a surface of the head-mounted display;

unlocking a locked feature of the head-mounted display based on the gesture sequence passcode matching a stored gesture sequence passcode; and in response to the gesture sequence passcode not matching the stored gesture sequence passcode, the locked feature remains locked.

17. A computer program product comprising at least one non-transitory computer-readable storage medium having computer-readable program code portions stored therein, the computer-readable program code portions comprising an executable portion configured to:

receive, at a multi-modal unlocking model, one or more electrical signals representative of a user interaction with at least one of a plurality of sensors mounted on a head-mounted display;

detect an initiate passcode gesture, indicating a start of a gesture sequence passcode comprising one or more passcode gestures in a series of passcode gestures;

detect a first passcode gesture in the series of passcode gestures;

detect a physical interaction delimiter between each passcode gesture, wherein the physical interaction delimiter comprises physical contact of a hand of the user with the head-mounted display, and wherein the physical contact comprises one or more taps on the head-mounted display, or a directional contact of the user on a surface of the head-mounted display;

unlock a locked feature of the head-mounted display based on the gesture sequence passcode matching a stored gesture sequence passcode; and in response to the gesture sequence passcode not matching the stored gesture sequence passcode, the locked feature remains locked.

* * * * *